Dec. 13, 1932.   P. W. BUR   1,891,140
CONVEYER
Filed June 14, 1929   2 Sheets-Sheet 1
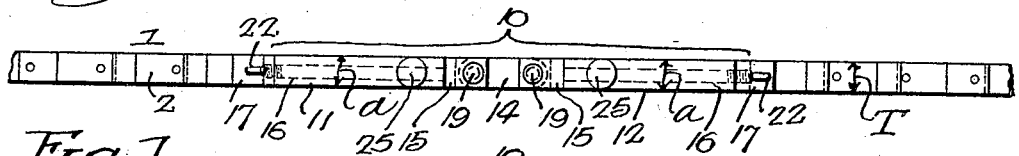
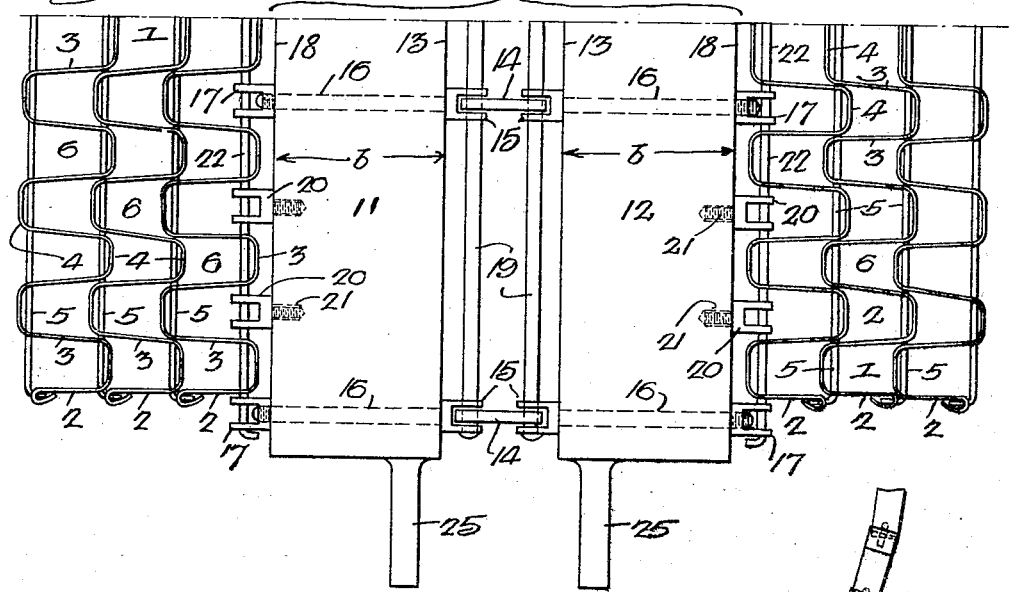
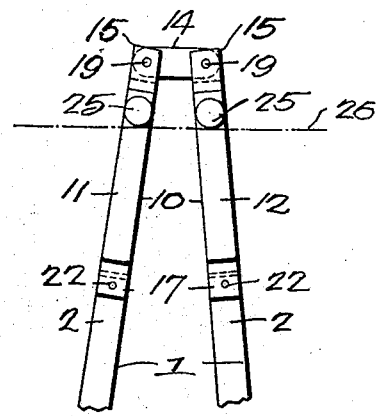
Inventor:
Philip W. Bur.
by his Attorneys
Howson & Howson Dec. 13, 1932.  P. W. BUR  1,891,140
CONVEYER
Filed June 14, 1929   2 Sheets-Sheet 2
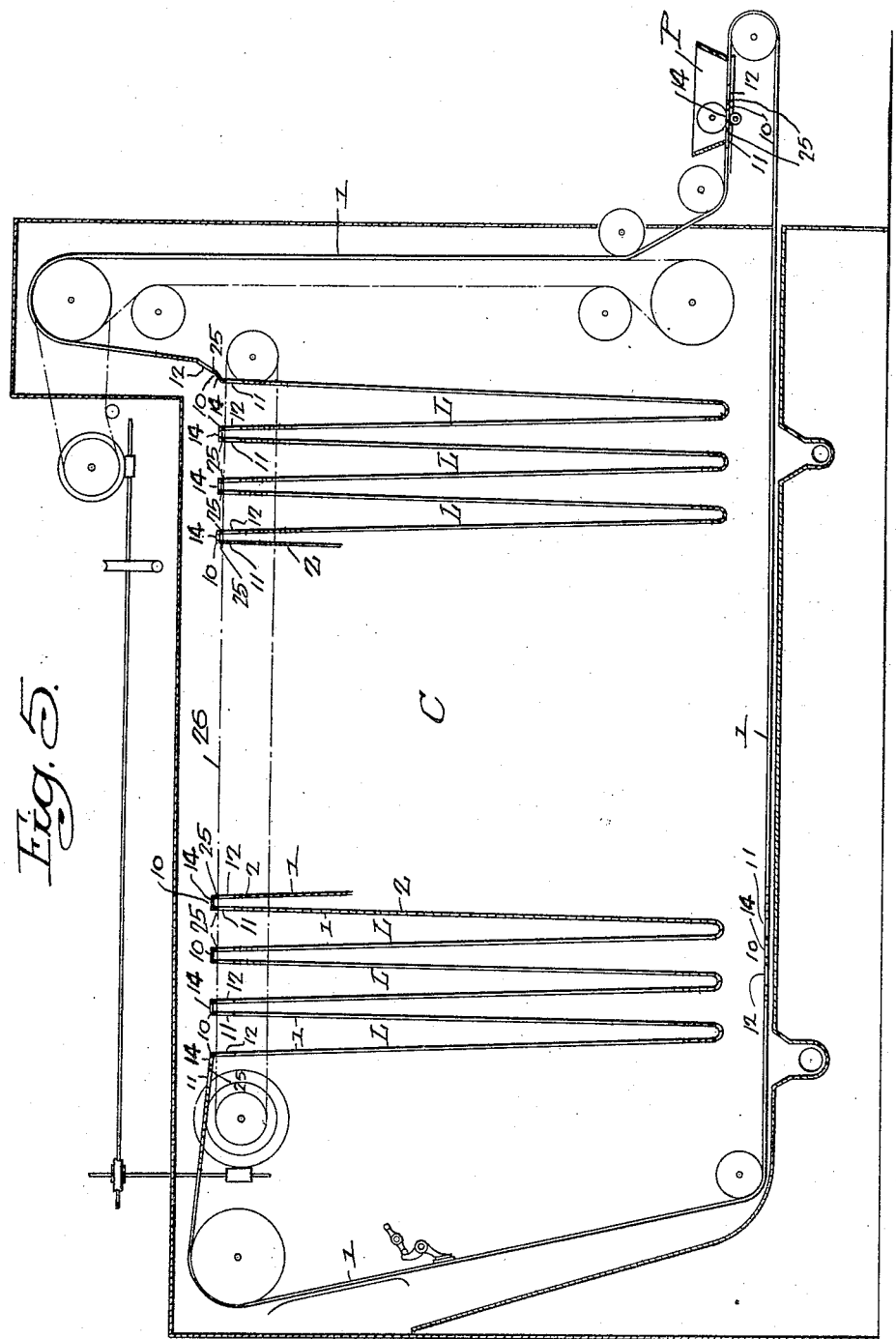

Patented Dec. 13, 1932

1,891,140

UNITED STATES PATENT OFFICE

PHILIP W. BUR, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA

CONVEYER

Application filed June 14, 1929. Serial No. 370,911.

This invention relates to a girt for use with a conveyer for plastic materials, such as that shown and described in the United States Letters Patent to Alpheus O. Hurxthal, No. 1,772,423, dated August 5, 1930, and No. 1,777,972, dated October 7, 1930.

As shown in the latter application the girts therein used for handling and supporting the conveyer belt are of a greater thickness than the thickness of the belt, consequently the apparatus for applying the plastic material to the belt must be so constructed that relative movement between the pasting apparatus and the belt will be permitted in order that the girts can readily pass through the pasting apparatus, and the said pasting apparatus thereafter assume a position which will be in such relation to the belt as to properly effect a pasting of the material in the openings of the belt.

Prior to my invention, it was thought that a girt which would have a thickness no greater than the belt would not have sufficient strength to support the weight of the loops of the conveyer, when loaded with the material to be dried, for the reason that such a girt, it was thought, would have to be supported on the loop carriers of the drier, shown in the latter application, in a position with the greater dimension of the girt parallel to the plane of and lying flat on the carriers, consequently the lesser dimension would be perpendicular to the plane of the carriers and under such circumstances the girt would not have sufficient strength to support the loaded conveyer loops, without warping or bending between the carriers.

The object of my invention is to provide a girt which will be of a thickness substantially equal to the thickness of the conveyer belt and at the same time will be of such a construction that when the belt is formed into loops, suspended from the loop carriers of the drier, the girt will assume a position relative to the carriers with its greater dimension disposed in a plane substantially perpendicular to the plane of the carriers, whereby the girt so disposed will have sufficient strength between the carriers to support the loops of the conveyor, and at the same time the pasting apparatus will not be required to have any relative movement with respect to the belt in order to permit the girts to pass through the pasting apparatus.

The construction of a girt made in accordance with the principles of my invention will be fully disclosed hereinafter, reference being had to the accompanying drawings, of which:

Fig. 1 is a plan view of a portion of a conveyer showing my improved girt applied thereto;

Fig. 2 is a side elevation of the conveyer and girt in the relative positions assumed while passing through the pasting apparatus;

Fig. 3 is a side elevation of a portion of the conveyer and one of the girts showing the relative positions assumed while the conveyer is supported in loops;

Fig. 4 is a side elevation of a portion of the conveyer and one of the girts in the positions assumed as the conveyer is being laid in loops upon the carriers, or as the conveyer is being withdrawn from such loops; and Fig. 5 is a diagrammatic longitudinal sectional elevation of a drier showing the conveyer for the plastic material supported in loops therein.

As noted in the first of the above mentioned patent applications, and as shown in the drawings of the present application, the conveyer 1 comprises a plurality of link sections 2, each of which is composed of a bar, having a rectangular cross-section, bent into a wave-like form and having a plurality of portions 3 which extend substantially longitudinally of the conveyer belt 1. The adjacent ends of adjacent pairs of the longitudinal portions 3, 3 of each link section are connected by transversely extending portions 4, 4, at the opposite edges of each link section 2, in alternate relation to each other, thus where the closed portions of the undulations of the link sections occur along one edge of the respective link sections, immediately opposite thereto, along the other edge of the respective link sections occurs an open space.

In assembling the link sections the closed portions of one link section extends into the open portions of the next adjacent section and a pivot rod or pintle 5 is passed transversely through the intermeshing portions of the adjacent link sections, as shown in Figs. 1 and 2, thereby forming openings 6, 6 in the conveyer belt which are adapted to receive the plastic material to be dried.

As shown in Figs. 1 and 2, the girt made in accordance with the principles of my invention is illustrated at 10 and comprises a pair of similar plates 11 and 12, respectively. Each of the plates 11 and 12 is rectangular in cross-section, of which the lesser dimension *a* is substantially the same as the thickness T of the belt 1, the greater dimensions *b*, of each of the plates 11 and 12, being considerably greater than the dimension *a* thereof.

As shown in the drawings, the plates 11 and 12 are positioned side by side and the adjacent mean edges 13, 13 of the plates are pivotally connected by links 14, 14, which in the present instance have their opposite ends disposed respectively in yoked heads 15, 15 of bolts 16, 16, which pass through the plates 11 and 12 in a direction extending longitudinally of the conveyer 1, being held in the plates 11 and 12 by yoked nuts or heads 17, 17 located along the extreme edges 18, 18 of the plates 11 and 12 respectively.

Pintles 19, 19 pass through the yoke heads 15, 15 of the bolts 16, 16 and through the links 14, 14 disposed in said yoked heads 15, thereby pivotally connecting the plates 11 and 12 of the girt 10.

Intermediate the yoked nuts or heads 17, 17 of the bolts 16, 16, along the extreme edges 18, 18 of the plates 11 and 12 respectively, are lugs 20, 20, which in the present instance are of similar construction to the yoked nuts or heads 17, 17 of the bolts 16, 16.

The lugs 20, 20 are provided with threaded shanks 21 tapped into corresponding openings formed in the extreme edges 18, 18 of the plates 11 and 12 respectively.

The heads 15, 15 in effect function as forked lugs to support the pintles 19, 19 and the heads 17, 17 and the lugs 20, 20 function in a like manner to support pintles 22, 22 which extend transversely of the conveyer 1 through these elements and the adjacent edges of the adjacently positioned link sections 2, 2 of the conveyer 1, to pivotally connect the girt 10 to the conveyer belt 1.

At the opposite ends of each of the plates 11 and 12, and adjacent the mean edges 13, 13 thereof, the girt 10 is provided with projections 25, 25 which extend laterally from each side of the conveyer 1 and function as a means for supporting the conveyer 1 in loops L on carrier elements 26, 26, as shown in Fig. 5, these carrier elements comprising endless chains operatively supported at the opposite sides of the drying chamber C of the drier D, and are respectively located adjacent the opposite longitudinal edges of the conveyer 1, and are to be engaged by and to support the supporting lugs or projections 25, 25 of the girts 10 when the conveyer belt 1 is hung in loops within the drier, the said girt folding in the manner illustrated in Fig. 3, whereby the greater dimension of each of the plates 11 and 12 is disposed in a plane substantially perpendicular to the plane of the supports or carriers 26, providing the necessary strength to support the loops of the conveyer without undue bending or warping the girt intermediate the carriers.

In Fig. 5, the pasting apparatus is diagrammatically illustrated at P, and shows the conveyer belt 1 passing therethrough to receive the plastic material to be dried.

I claim:

1. The combination with a conveyer belt of a sectional rectangular girt interposed in said belt and having a thickness substantially equal to that of the belt, and means for pivotally connecting the sections of said girt transversely of said belt.

2. The combination with a conveyer belt of a sectional rectangular girt interposed in said belt and having a thickness substantially equal to that of the belt, means for pivotally connecting the sections of said girt transversely of said belt, and supporting means on the ends of said girt and projecting laterally from the longitudinal side edges of said belt.

3. The combination with a conveyer belt of a girt interposed in said belt and comprising a pair of substantially rectangular and pivotally connected plates each of which is substantially the same thickness as the belt.

4. The combination with a conveyer belt of a girt interposed in said belt and comprising a pair of plates having rectangular cross-sections respectively the lesser dimension of the cross-section of each plate being substantially equal to the thickness of the belt, and means for pivotally connecting said plates.

5. The combination with a conveyer belt of a girt interposed in said belt and comprising a pair of plates having rectangular cross-sections respectively disposed in side by side relation to each other, the lesser dimension of the cross-section of each plate being substantially equal to the thickness of the belt, and means for pivotally connecting said plates along their adjacently disposed edges.

6. The combination with a conveyer belt of a girt interposed in said belt and comprising a pair of plates having rectangular cross-sections respectively disposed in side by side relation to each other, the lesser dimension of the cross-section of each plate being substantially equal to the thickness of the belt, means for pivotally connecting said plates along their adjacently disposed edges, and means on said girt and extending laterally from the oppositely disposed longitudinal edges of the belt, affording a support for said belt outside thereof.

7. The combination with a conveyer belt of a girt interposed in said belt and comprising a pair of plates having rectangular cross-sections respectively disposed in side by side relation to each other, the lesser dimension of the cross-section of each plate being substantially equal to the thickness of the belt, and links extending between and pivotally attached at their respective ends to the adjacent edges of said plates for pivotally connecting said plates transversely of the belt.

8. The combination with a conveyor belt of a girt interposed in said belt and comprising a pair of plates having rectangular cross-sections respectively disposed in side by side relation to each other, the lesser dimension of the cross-section of each plate being substantially equal to the thickness of the belt, links extending between and pivotally attached at their respective ends to the adjacent edges of said plates for pivotally connecting said plates transversely of the belt, and lugs on the opposite ends of each plate and extending laterally from the opposite longitudinal edges of the belt for supporting said belt at a point outside thereof.

9. The combination with a conveyor belt of a girt interposed in said belt and comprising a pair of plates having rectangular cross-sections respectively disposed in side by side relation to each other, the lesser dimension of the cross-section of each plate being substantially equal to the thickness of the belt, links extending between and pivotally attached at their respective ends to the adjacent edges of said plates for pivotally connecting said plates transversely of the belt, carriers for said belt disposed in horizontal planes adjacent the longitudinal edges of said belt, and lugs on the opposite ends of each plate and extending laterally from the opposite longitudinal edges of the belt and adapted to engage said carriers for supporting said belt at a point outside thereof whereby said belt may be formed in loops on said carriers and the said plates of the girt fold on their pivots and hang from the carriers in positions with the greater dimension of their cross-sections disposed substantially in vertical planes.

10. The combination with a conveyor belt of a girt interposed in said belt and comprising a pair of plates extending in side by side relation transversely of the belt, each of said plates having a cross-section of unequal dimensions, the lesser dimension of which is substantially equal to the thickness of the belt, the greater dimension lying in a plane included within the belt, means for pivotally connecting the said plates along their adjacent edges, carriers for said belt located in horizontal planes outside and adjacent the longitudinal edges of the belt, and means on said girt extending laterally from the opposite longitudinal edges of the belt and adapted to rest on said carriers, whereby the said belt may be formed in loops between said carriers, the said plates folding about their pivots and assuming positions wherein the said greater dimension of their respective cross-sections lies in substantially vertical planes.

11. The combination with a conveyer belt of a sectional girt interposed in said belt, and means for pivotally connecting the sections of the girt transversely of the belt.

PHILIP W. BUR.